United States Patent
Yu

(10) Patent No.: US 8,245,403 B2
(45) Date of Patent: Aug. 21, 2012

(54) PROCESS OF MAKING BASE OF SHOCK-ABSORBING FRONT FORK FOR BICYCLE

(75) Inventor: Kuo-Pin Yu, Taichung (TW)

(73) Assignee: Yuan Min An Enterprise Co., Ltd., Taichung Taiwan (CN)

( * ) Notice: Subject to any disclaimer, the term of this patent is extended or adjusted under 35 U.S.C. 154(b) by 68 days.

(21) Appl. No.: 12/765,308

(22) Filed: Apr. 22, 2010

(65) Prior Publication Data

US 2010/0199498 A1 Aug. 12, 2010

Related U.S. Application Data

(63) Continuation of application No. 12/107,469, filed on Apr. 22, 2008, now abandoned.

(51) Int. Cl.
*B21D 53/88* (2006.01)

(52) U.S. Cl. ........ 29/897.2; 29/419.1; 29/469; 280/276; 280/279; 280/281.1

(58) Field of Classification Search ................ 29/897.2, 29/469, 419.1, 897, 421.1, 897.31, 897.312; 280/276, 279, 280, 283, 288.3, 281.1
See application file for complete search history.

(56) References Cited

U.S. PATENT DOCUMENTS

| | | | | |
|---|---|---|---|---|
| 4,657,795 | A | * | 4/1987 | Foret ........................ 280/281.1 |
| 4,828,285 | A | * | 5/1989 | Foret et al. .................... 280/279 |
| 5,016,895 | A | * | 5/1991 | Hollingsworth et al. ..... 280/280 |
| 5,039,470 | A | * | 8/1991 | Bezin et al. ................... 264/255 |
| 5,078,417 | A | | 1/1992 | Mouritsen .................... 280/280 |
| 5,181,732 | A | | 1/1993 | Bezin et al. ................... 280/279 |
| D368,054 | S | | 3/1996 | Behrens et al. .............. D12/118 |
| 5,626,355 | A | | 5/1997 | Voss et al. ..................... 280/276 |
| 5,762,352 | A | * | 6/1998 | Lee ............................... 280/280 |
| D401,537 | S | | 11/1998 | Turner ......................... D12/118 |
| D415,449 | S | | 10/1999 | Tsai ............................. D12/118 |
| 6,049,982 | A | * | 4/2000 | Tseng .......................... 29/897.2 |
| D470,440 | S | | 2/2003 | Rose et al. ................... D12/118 |
| 6,607,185 | B2 | | 8/2003 | Graves et al. .............. 267/64.26 |
| 7,413,207 | B2 | | 8/2008 | Yu ................................. 280/279 |
| 7,503,576 | B1 | * | 3/2009 | Schroeder .................... 280/280 |
| 2003/0001358 | A1 | | 1/2003 | Becker et al. ................ 280/276 |
| 2004/0084871 | A1 | | 5/2004 | Galasso ....................... 280/276 |
| 2008/0309049 | A1 | * | 12/2008 | Yu ............................. 280/281.1 |

* cited by examiner

*Primary Examiner* — David Bryant
*Assistant Examiner* — Ryan J Walters
(74) *Attorney, Agent, or Firm* — Browdy and Neimark, PLLC

(57) ABSTRACT

A process of making a base of a shock-absorbing front fork for a bicycle, includes the steps of winding pre-pregs around an upper section of each of two cured straight tubes to form a bridge having a foamed core therein, and placing the two straight tubes and the bridge in a mold and heating the mold for curing the bridge such that the bridge and the straight tubes are connected integrally.

2 Claims, 3 Drawing Sheets

PROCESS OF MAKING BASE OF SHOCK-ABSORBING FRONT FORK FOR BICYCLE

CROSS REFERENCE TO RELATED APPLICATIONS

This is a continuation application of U.S. patent application Ser. No. 12/107,469 which was filed on Apr. 22, 2008 now abandoned entitled BASE OF SHOCK-ABSORBING FRONT FORK FOR BICYCLE, the disclosure of which is incorporated herein by reference.

BACKGROUND OF THE INVENTION

1. Field of the Invention

The present invention relates generally to a bicycle, and more specifically to a base of a shock-absorbing front fork for a bicycle, which has advantages of high structural strength and long service life such that the base is suitable to be mounted on a mountain bicycle especially.

2. Description of the Related Art

A conventional shock-absorbing front fork for a bicycle includes an upper frame and a base. The upper frame has an upright tube, a fork crown connected with a bottom end of the upright tube, and two branch tubes respectively extending downward from each of two ends of the fork crown. The base has two straight tubes for receiving the branch tubes of the upper frame, and a bridge connected with the straight tubes. A front wheel is pivotally mounted to bottom ends of the straight tubes. Silicone oil and/or a spring are received inside each straight tube to provide a shock-absorbing effect.

However, the straight tubes and the bridge are manufactured individually and connected with each other by adhesive. After the base is used for a long time, the adhesive between the straight tubes and the bridge will easily generate crevices due to the fatigue or the decline of the adhesive, causing separation of the straight tubes and the bridge.

SUMMARY OF THE INVENTION

The present invention has been accomplished in view of the above-noted circumstances. It is one objective of the present invention to provide a base of a shock-absorbing front fork for a bicycle, which has high structural strength.

It is another objective of the present invention to provide a base of a shock-absorbing front fork for a bicycle, which has long service life.

To achieve these objectives of the present invention, the base comprises two straight tubes and a bridge. The bridge has two ends connected integrally with an upper section of each of the straight tubes, and a chamber therein.

Accordingly, the base of the present invention has high structural strength and long service life.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
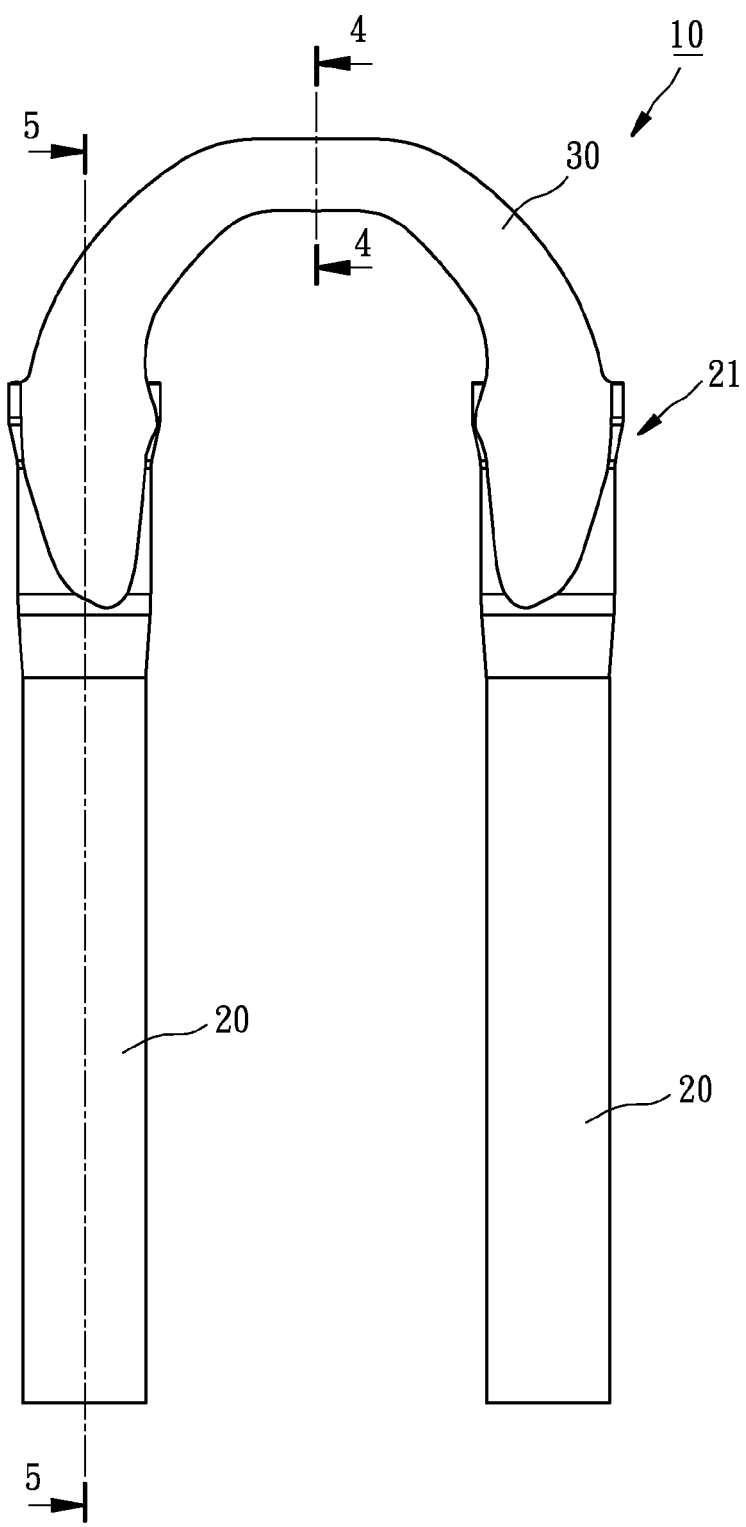
FIG. 1 is a front view of the base according to a preferred embodiment of the present invention.
Figure 2:
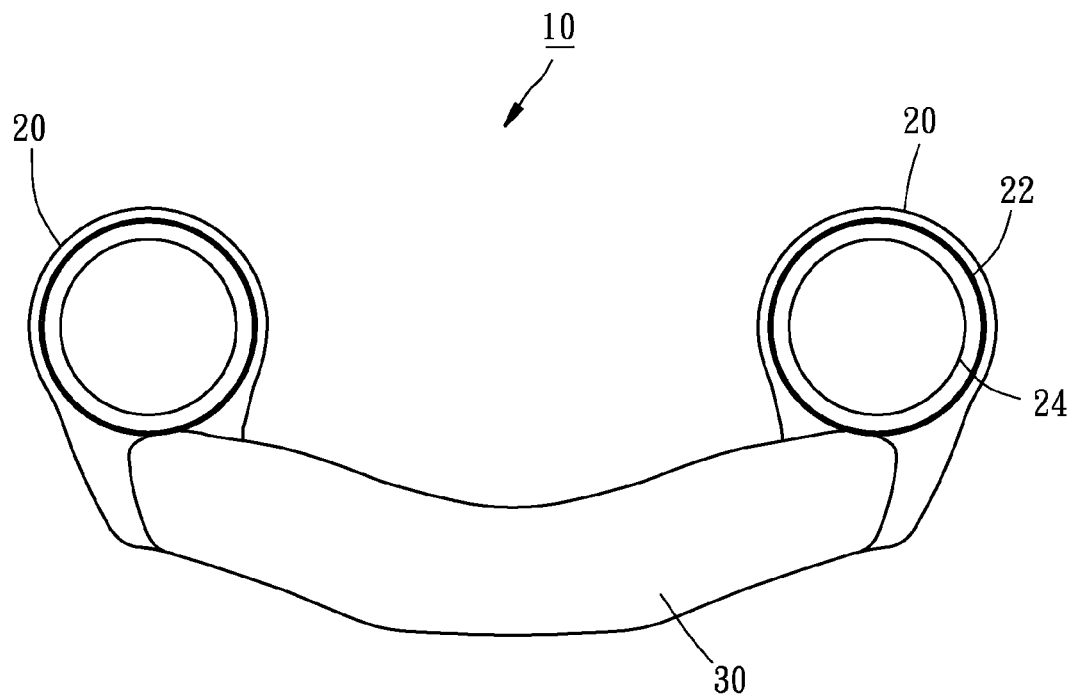
FIG. 2 is a top view of the base according to the preferred embodiment of the present invention.
Figure 4:
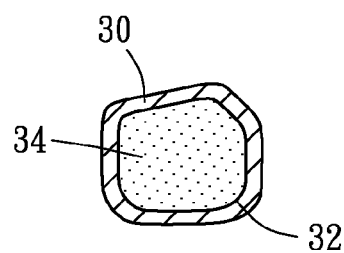
FIG. 4 is a sectional view taken along line 4-4 of FIG. 1.
Figure 3:
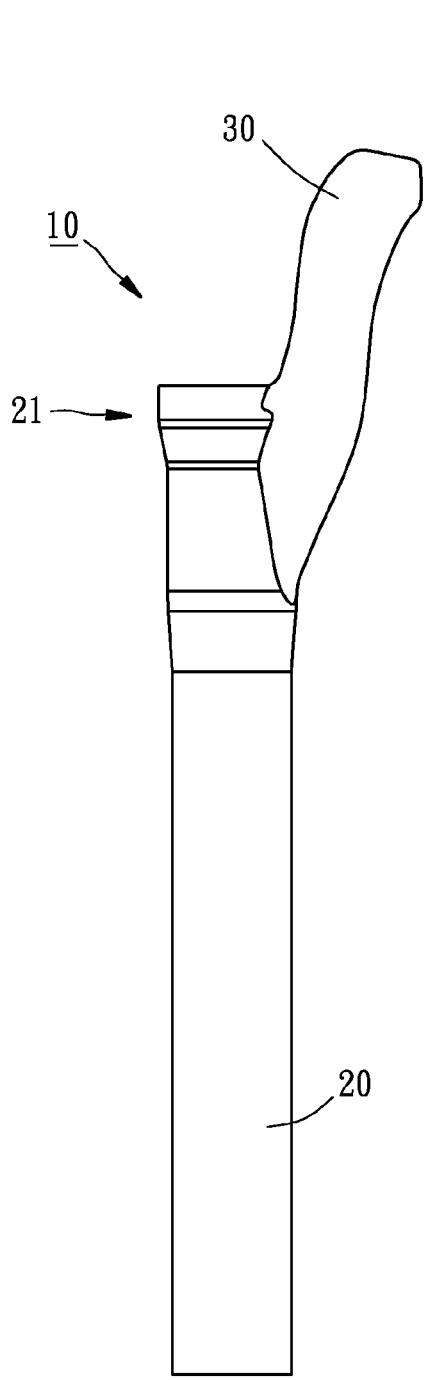
FIG. 3 is a lateral view of the base according to the preferred embodiment of the present invention.

As shown in FIGS. 1-4, a base 10 of a shock-absorbing front fork for a bicycle in accordance with the preferred embodiment of the present invention is made of fiber reinforced resin. The fiber can adopt, but not limited to, carbon fiber, glass fiber, boron fiber or Kevlar fiber. The resin can adopt, but not limited to, thermosetting resin or thermoplastic resin. The base 10 comprises two straight tubes 20 and a bridge 30.

The straight tubes 20 each have a large diameter portion 22 located at an upper section 21 thereof for accommodation of an oil seal (not shown), and a small diameter portion 24 for receiving a branch tube of an upper frame (not shown).

The bridge 30 has two ends connected integrally with the upper section 21 of each of the straight tubes 20, a chamber 32 therein, and a foamed core 34 inside the chamber 32.

Figure 5:
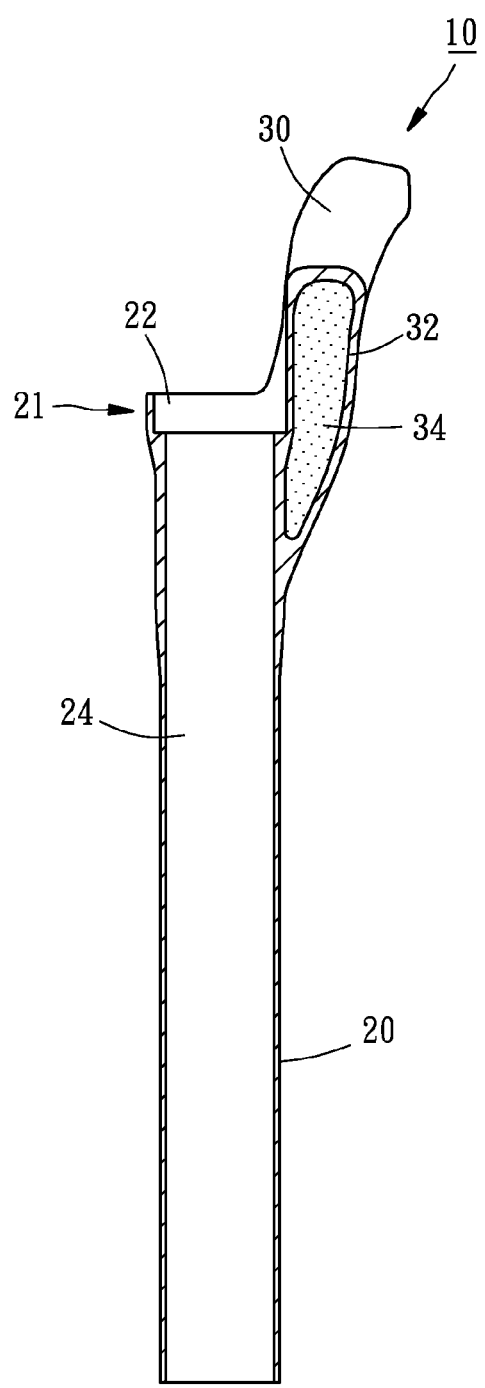
FIG. 5 is a sectional view taken along line 5-5 of FIG. 1.

During the actual manufacture, the two straight tubes 20 are cured first, and then pre-pregs are wound around the upper sections 21 of the straight tubes 20 to form a model of the bridge 30 having the foamed core 34 therein. Next, the model of the bridge 30 and the foamed core 34 are placed in a mold (not shown) to be cured into its desired shape with heat treatment such that the pre-pregs are abutted against an inner wall of the mold due to inflation of the foamed core 34. As a result, the bridge 30 and the straight tubes 20 can be connected integrally with each other without any gap between the bridge 30 and the straight tubes 20, as shown in FIG. 5. Therefore the structure strength of the base 10 is high enough to bear high stress, and the service life of the base 10 is long such that the base 10 is suitable to be mounted on a mountain bicycle especially.

The base 10 of the shock-absorbing front fork of the present invention can be made with various kinds of design on the basis of the spirit of the present invention. For example, the foamed core 34 can be replaced by other liquids or solids, which can be changed to gas after heat treatment. Further, the shape of the large diameter portions 22 and the small diameter portions 24 of the straight tubes 20 are not limited to the above-mentioned embodiment, even the large diameter portions 22 and the small diameter portions 24 can be eliminated subject to the actual need.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process of making a base of a shock-absorbing front fork for a bicycle, comprising the steps of:

a) providing two straight tubes made of fiber reinforced resin, each of which have a large diameter portion located at an upper section thereof and a smaller diameter portion;

b) curing the two straight tubes;
c) winding pre-pregs around the upper section of each of two cured straight tubes to form a model of a bridge having a foamable core encased therein;
d) placing the model of the bridge and the foamable core in a mold;
e) heating the mold in such a way that the pre-pregs are abutted against an inner wall of the mold due to inflation of the foamable core so as to cure the model into a desired shape; and
f) obtaining the base comprising the bridge and the straight tubes which are connected integrally, wherein the base is made of fiber reinforced resin.

2. A process of making a base of a shock-absorbing front fork for a bicycle, comprising the steps of:
a) providing two straight tubes made of fiber reinforced resin, each of which have a large diameter portion located at an upper section thereof and a smaller diameter portion;
b) curing the two straight tubes;
c) winding pre-pregs around the upper section of each of two cured straight tubes to form a model of a bridge having a liquid or solid core encased therein; and
d) placing the model of the bridge and the core in a mold;
e) heating the mold in such a way that the pre-pregs are abutted against an inner wall of the mold due to gas which is changed from the liquid or solid core after the liquid or solid core is heated so as to cure the model into a desired shape; and
f) obtaining the base comprising the bridge and the straight tubes which are connected integrally, wherein the base is made of fiber reinforced resin.

* * * * *